United States Patent [19]

Menk et al.

[11] Patent Number: 5,251,238
[45] Date of Patent: Oct. 5, 1993

[54] CIRCUIT ARRANGEMENT AND METHOD FOR THE REGENERATION AND SYNCHRONIZATION OF A DIGITAL SIGNAL

[75] Inventors: Klaus-Dieter Menk, Eppstein-Bremthal; Helmut Preisach, Murr, both of Fed. Rep. of Germany

[73] Assignee: Alcatel N.V., Amsterdam, Netherlands

[21] Appl. No.: 741,682

[22] Filed: Aug. 7, 1991

[30] Foreign Application Priority Data

Aug. 7, 1990 [DE] Fed. Rep. of Germany ....... 4025004

[51] Int. Cl.$^5$ ............................................. H04L 7/00
[52] U.S. Cl. ..................................... 375/106; 375/96; 375/101; 375/118
[58] Field of Search ................ 375/12, 14, 18, 96, 375/99, 101, 106, 111, 118

[56] References Cited

U.S. PATENT DOCUMENTS

| | | | |
|---|---|---|---|
| 4,071,827 | 1/1978 | Koike et al. | 375/12 |
| 4,435,823 | 3/1984 | Davis et al. | 375/14 |
| 4,694,468 | 9/1987 | Cullum | 375/12 |
| 4,769,816 | 9/1988 | Hochstadt et al. | 375/96 |
| 4,789,994 | 12/1988 | Randall et al. | 375/12 |
| 4,810,101 | 3/1989 | Kage et al. | 375/99 |

FOREIGN PATENT DOCUMENTS 3543392 6/1987 Fed. Rep. of Germany .

*Primary Examiner*—Curtis Kuntz
*Assistant Examiner*—Don N. Vo
*Attorney, Agent, or Firm*—Ware, Fressola, Van Der Sluys & Adolphson

[57] ABSTRACT

For regeneration and synchronization of a high-bit-rate digital signal, a series circuit of a controllable delay line and a decision logic is traversed by the digital signal. The decision logic contains a sampling circuit, by means of which the digital signal is sampled in the middle of its eye opening.

17 Claims, 6 Drawing Sheets

CIRCUIT ARRANGEMENT AND METHOD FOR THE REGENERATION AND SYNCHRONIZATION OF A DIGITAL SIGNAL

BACKGROUND OF THE INVENTION

1. Field of the Invention

The invention relates to a circuit arrangement and a process for regeneration and synchronization of a high-bit rate digital signal, which can have any desired phase position and be subject to jitter and wander from the system clock.

2. Description of the Prior Art

In conventional synchronization equipment and processes, phase-locked loops (PLL) are used, by means of which the sampling of a digital signal is carried out. However, PLLs contain relatively large capacitances which are poorly integrated. In addition, undesired coupling of several PLLs frequently cause problems, such as, for example, beating and hunting.

A circuit arrangement for the regeneration and synchronization of a high-bit-rat digital signal is also known from German Patent 35 43 392, which features a delay line, a multiplexer, and an evaluation circuit. The evaluation is carried out, among other things, by the use of flip-flops and another delay line. In this process, the digital signal is sampled in the region of its edge, with a window function being provided. It has been found, however, that in an evaluation of a signal of this type, jitter can lead to incorrect information, and also the control region of the circuit arrangement is restricted.

SUMMARY OF THE INVENTION

It is an objective of the invention to create a circuit arrangement and a process for the simple and, over broad ranges, error-free regeneration and synchronization of a high-bit-rate digital signal. In this process, it should be possible for the signal to have any desired phase location and be subject to jitter and wander away from the system clock.

This problem is solved by a circuit arrangement for regenerating and synchronizing a high-bit-rate digital signal, comprising a variable delay line, a decision logic connected in series with the delay line, said series connection being traversed by the digital signal, and a sampling circuit in said decision logic which samples the digital signal in the middle of its eye opening, and by a method of regenerating and synchronizing a high-bit rate digital signal comprising the steps of tapping individual signals $x_{(n)}$ and $y_{(n+k)}$ from a delay line, correlating the tapped signals by discrete correlation, determining the maximum correlation to determine the middle of the eye opening, and adjusting a multiplexer to the middle of the eye opening.

Through the use of a sampling circuit, by means of which the digital signal is sampled in the middle of its eye opening, a very high insensitivity towards jitter of the signal is obtained during regeneration and synchronization of the digital signal.

Particularly preferred is an embodiment of the circuit arrangement in which the sampling circuit contains at least one correlation circuit and a multiplexer and also at least one logic circuit, which evaluates the output signals of the correlation circuit and controls the multiplexer. Through the use of a line referred to below as a delay line, the sampling time can be determined optimally by means of a correlation. For this, the individual taps of the delay line are correlated with each other.

The maximum correlation is determined in a logic circuit for determination of the middle of the eye opening and, thus, of the optimal sampling time. Finally, a multiplexer is adjusted to this sampling time. Because of the fact that the sampling of the signal takes place in the middle of the eye opening, a high-frequency jitter of the signal with respect to the system clock does not lead to problems.

Particularly preferred is an embodiment of the process in which a discrete correlation of the taps takes place. As a result, the process can be realized with a particularly simple digital circuit which, in addition to a delay line, contains multipliers and discrete integrators.

According to a further development of the circuit arrangement and of the process, in a value-discrete consideration of the sampled signals, these are assigned a specific value: For example, '1' for HIGH levels and '−1' for LOW levels. As a result, a considerable simplification of the circuit members is possible: EXOR gates are used as multipliers and counters as integrators.

A preferred embodiment of the circuit arrangement uses reduced circuitry. In this embodiment, two multiplexers are provided for serial calculation of the correlation, which, through a delay circuit, act together with an additional multiplexer. The results of the serial correlation are stored in a buffer. The values present there are calculated in a logic circuit for determining the maximum correlation of the eye opening as an optimal sampling time. With this circuit, a multiplexer can be optimally adjusted with relatively little effort, even for a delay line with unknown delay time.

Also preferred is an embodiment of the circuit arrangement in which, to compensate for a bit-slip based on wander, a memory, preferably a FIFO memory, is provided. On the basis of this circuit, it is possible to compensate, with relatively little effort, for a bit-slip based on the fact that the eye opening serving for momentary sampling, wanders out of the delay line.

Furthermore, an embodiment of the circuit arrangement is preferred in which a memory with variable length is used. The data is read into this memory by two multiplexers, with the length of the memory being adjusted via two additional multiplexers. With this relatively simple circuit, bit errors based on a wander of the signal can be prevented.

Also preferred is an embodiment of the process in which, for compensation of wander of the data signal from the system clock, a new eye opening is selected as a new sampling point, with the new eye opening also being determined by means of a correlation. In this case, parallel to the correlation with which the eye opening of the momentary sampling time is determined, a correlation is carried out in order to obtain correlation values with the data before and/or after the momentary correlation time. A comparison of the correlation results obtained in this way shows when the momentary sampling has wandered out of the eye opening. By means of this process, it is possible to adjust a new scanning time without bit errors, if the momentary value wanders out of the delay line because of wander.

Particularly preferred is an embodiment of the process in which a delay line with known delay time is used. EXOR gates are again used as multipliers, but one-bit counters are used as integrators. The process can therefore be carried out very simply and inexpensively.

In a further development of the process, in a delay line with unknown delay time, a simplification of the process is achieved by the fact that the correlation is calculated serially, and the correlation results for determination of the eye opening are stored in a buffer.

To prevent a bit slip, in a preferred embodiment of the process, a memory, preferably a FIFO memory, is used, into which the new and old data are written at the same clock pulse time, if the data signal is faster than the system clock. If, however, the data signal is slower than the clock, the data signals used for the correlation are delayed by a clock period, without an entry into the memory being made.

In a particularly preferred form of the process, there is used for bit slip compensation a memory, preferably a FIFO memory, whose length is extended by means of a multiplexer if the data signal is faster than the clock, and whose length is shortened if the data signal is slower than the clock.

DESCRIPTION OF THE DRAWINGS

The invention will be explained in greater detail below with reference to the figures.

DETAILED DESCRIPTION OF THE INVENTION

To clarify the function of the synchronization device and of the process, a correlation circuit will be explained with reference to FIG. 1, by means of which a discrete correlation can be realized in accordance with the following equation:

$$R_{(k)} = \sum_{n=0}^{N-1} x_{(n)} \cdot y_{(k+n)}$$

in which $k=0, \ldots, L-1$, where N is the integration constant and L the number of sampling values or taps.

At the very top of FIG. 1, a delay line, referred to hereinafter as delay line 1, is indicated. The different delay stages 3 are indicated by the blocks identified by a 't'.

The signal $y_{(n)}$ is fed to the delay line.

Below the delay line, several multipliers 5 are drawn in, which are supplied on the one hand, with values sampled from the delay line 1 and, on the other hand, with clock signals $x_{(n)}$ of the delay line.

The signals produced by the multipliers 5 are supplied to the integrators 7, which are designed as counters in this case.

The multipliers 5 and the integrators 7 are parts of correlation circuits, with the output signals of the integrators representing the correlation results $R_{(0)}$, $R_{(1)}$, $R_{(2)}, \ldots, R_{(L-1)}$.

Figure 1:
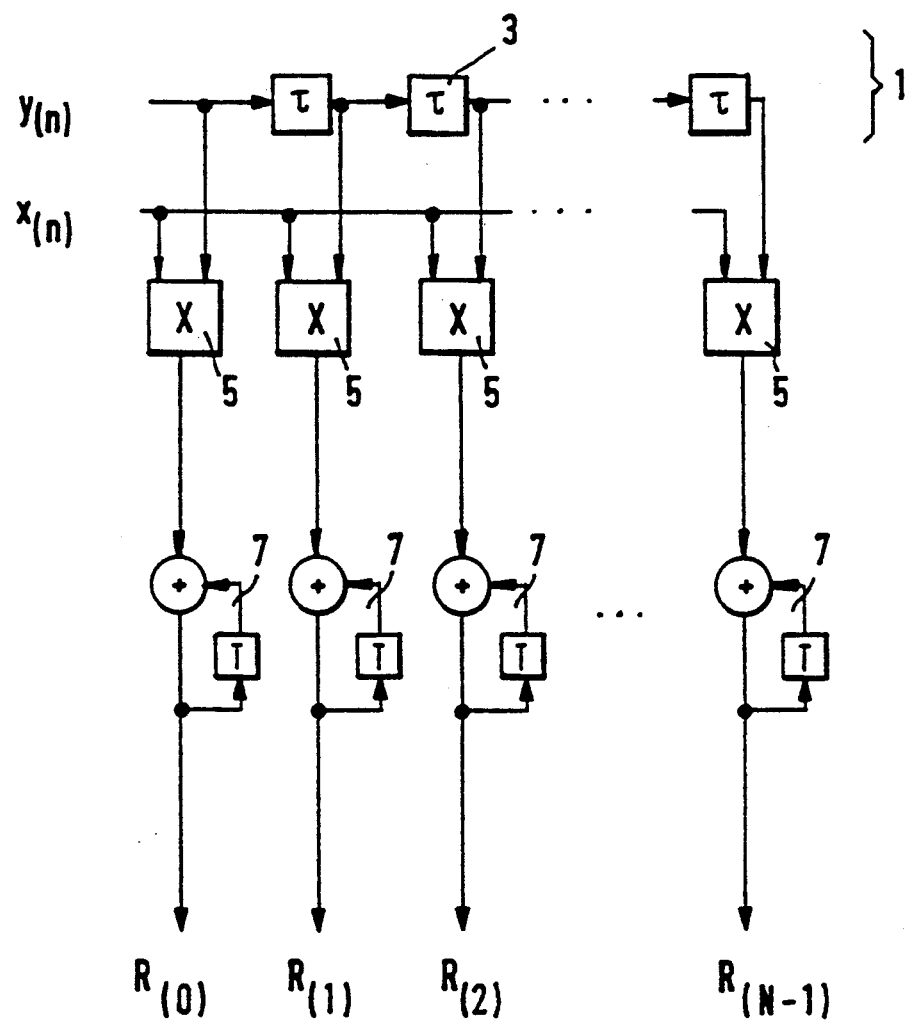
FIG. 1 is a schematic diagram of a correlator for processing the sampled signals of a delay line.
Figure 2:
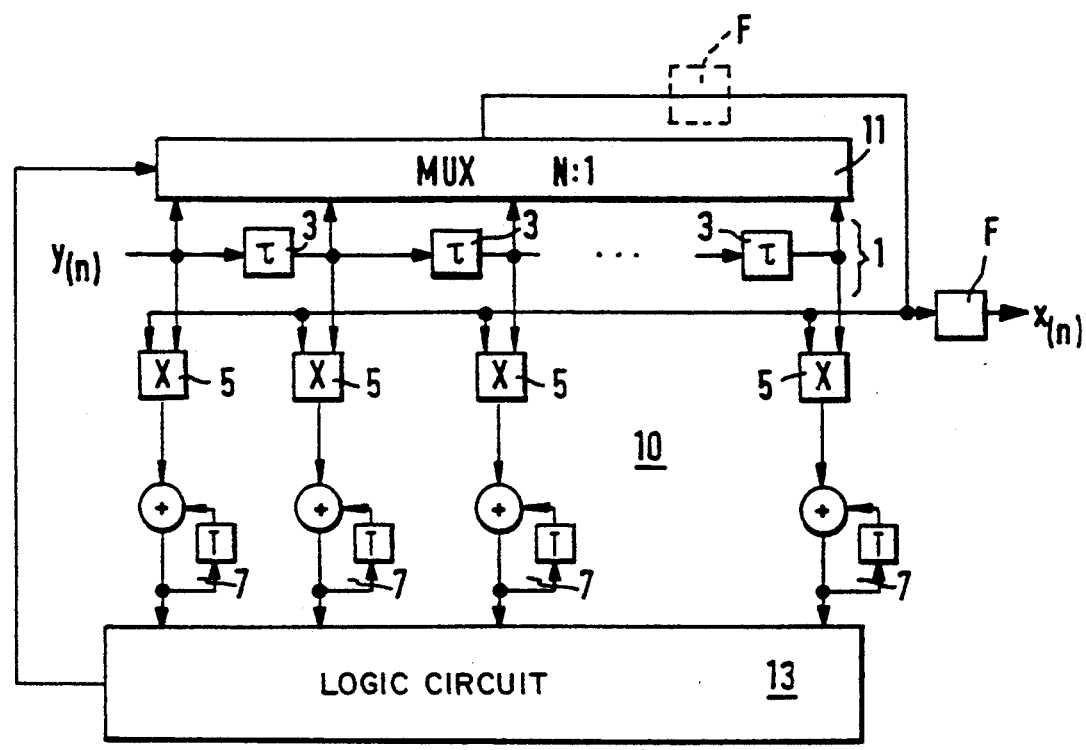
FIG. 2 is a schematic diagram of a synchronization circuit with a correlator according to FIG. 1.

FIG. 2 shows a synchronization circuit 10 containing a correlator according to FIG. 1, with a multiplexer 11 designated by MUX connected to the delay line 1, and a logic circuit 13, which evaluates the correlation results, i.e., determines the maximum values of the correlation. Where the eye is open, the correlation reaches its maximum.

The logic circuit 13 serves to adjust the multiplexer 11 to the eye opening and, thus, to the most favorable sampling moment.

The multiplexer 11 of the synchronization circuit 10 is adjusted to the center of the eye during sampling of the data signals. The selection of the sampling moment is carried out on the basis of previous correlations, for which two multiplexers could also be provided.

During the sampling of the data signal by the multiplexer 11, the output of which is the synchronized data signal $x_{(n)}$, a continuous correlation of the synchronized data signal with the signal $y_{(n)}$ applied to the input of the delay line 1 takes place. This correlation serves to monitor the synchronization circuit and the adjustment of the sampling moment. It is checked whether the multiplexer still correctly samples the data signal in the center of the eye. The monitoring function will be discussed in greater detail below.

At the output $x_{(n)}$, a flip-flop F, preferably a D type flip-flop, can be provided, which is clocked with the bit clock and which samples the data signal with the bit clock. In this way, a regeneration of the data signal is made possible which, in addition, is also brought into the clock phase, i.e., into the clock phase of the circuit arrangement.

The broken line in FIG. 2 indicates that the flip-flop F can also be located directly behind the multiplexer 11.

As a result, a multiplier simpler in terms of circuit engineering can be used. In addition, instead of the cross-correlation, one obtains the pulse response of the transmission system that is connected ahead of the circuit arrangement shown in FIG. 2.

The form of the signal curve is determined by the integrators 7 as a function of the integration time.

Figure 3:
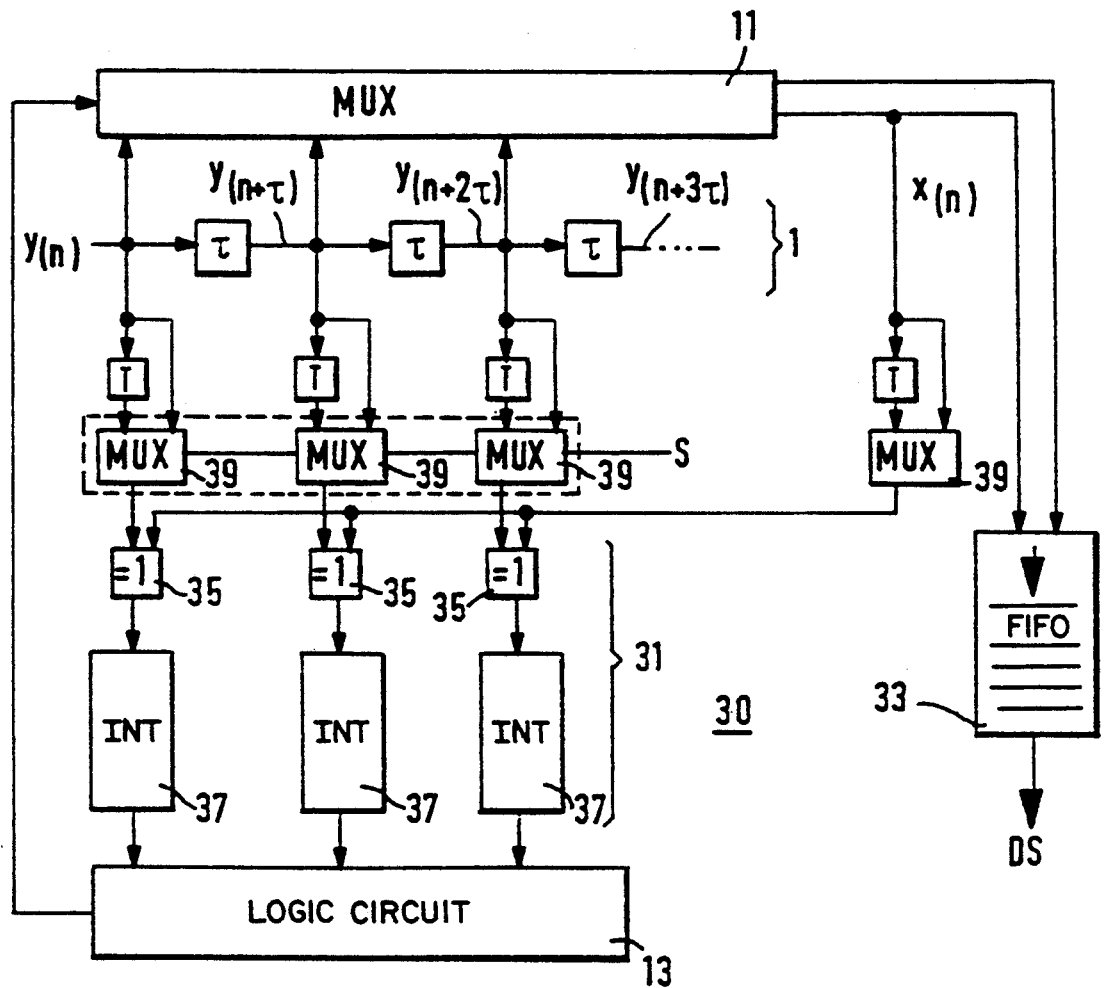
FIG. 3 is a schematic diagram of a synchronization circuit with a correlator and with a bit slip compensation.

FIG. 3 shows a synchronization circuit 30 with a correlator 31 and with a memory 33 serving for bit slip compensation.

To simplify the representation, in this figure—as in FIGS. 1 and 2—the delay line 1 is indicated only by three delay members. The correlator 31 is indicated in this case by an EXOR gate 35 serving as a multiplier and by counters 37 connected in series, which serve as integrators. Hold flip-flops, i.e., 1-bit counters, can be used as counters. The results of the correlation are evaluated by a logic circuit 13.

However, in the correlation in this case, the signals $y_{(n)}$, which are applied to the input of the delay line 1, and the signal $x_{(n)}$ the output of the multiplexer 11, are not used. Instead, either the signals $y_{(n)}$ or the signals $x_{(n)}$ are delayed by a clock period T. Delay members T are therefore shown in FIG. 3. However, for clarification in this case, delay members of this type are assigned to both signals $y_{(n)}$ and $x_{(n)}$ but, for the calculation of the correlation, only one of these signals is delayed at a given time.

It can be seen from FIG. 3 that both signals are supplied to multiplexers 39 before the correlation. The three multiplexers 39 receiving the $y_{(n)}$ signals are located on a common control line S.

By using the structure of the circuit shown, in addition to the actual correlation leading to a specific center of the eye opening at the sampling time, one also obtains a correlation value with the data before or after this actual correlation.

This therefore means that the following equations are obtained, in which T represents the period length of the system clock:

$$R_{-1(k)} = \sum_{n=0}^{N-1} x_{(n+T)} \cdot y_{(k+n)}$$

$$R_{0(k)} = \sum_{n=0}^{N-1} x_{(n)} \cdot y_{(k+n)}$$

$$R_{+1(k)} = \sum_{n=0}^{N-1} x_{(n)} \cdot y_{(k+n+T)}$$

As a result of the fact that correlation results with different data are present, a permanent comparison of the momentary sampling time with other possible times can be carried out in the logic circuit 13. This means that the correlation results of the various correlation calculations running in parallel provide correlation functions that are compared with each other. It can therefore be detected in the logic circuit when one eye opening on which the momentary sampling is based wanders out of the delay line 1, that is, when a different eye opening should be used as a basis for the sampling, in order to maintain an optimal synchronization. Even when an eye opening has not reached the edge of the delay line, the eye opening on which the sampling is based can be abandoned and another one can be selected.

By means of wander, the eye opening selected for a sampling can leave the delay line, which can have only a limited length. In this case, while the one eye opening leaves the delay line, at least one new eye opening will appear on the delay line. This is found with the use of the correlation results $R_{-1(k)}$ and $R_{+1(K)}$.

As soon as the eye opening on which the actual scanning is based wanders beyond the end of the delay line because of wander, a bit error appears. This can be prevented by promptly searching for a new open eye within the delay line. However, a bit error cannot be prevented by the fact that one merely shifts the sampling time from the original eye to the new open eye. It is also required that the value obtained in the sampling of the signal for the original eye and the value obtained in the sampling with the new eye be stored. For this, it is necessary to write the old and new data at the same clock pulse time in a memory, which is designed as a FIFO in this case. However, this applies only if the data signal is faster than the system clock.

In the opposite case, i.e., when the data signal is slower than the clock, a value is skipped. This means that one waits for one clock pulse period and skips an entry into the memory. Nothing is therefore stored in the FIFO during the waiting.

In this process, the new eye opening is again obtained by a correlation. In this correlation, however, the data signal $x_{(n)}$ or $y_{(n+k)}$ is delayed by one clock period. In this manner—as was stated above by means of the explanations for FIG. 3—one obtains a correlation with data before or after the $x_{(n)}$ on which the actual sampling is based.

At the output of the memory 33 is the synchronized data signal DS.

Figure 4:
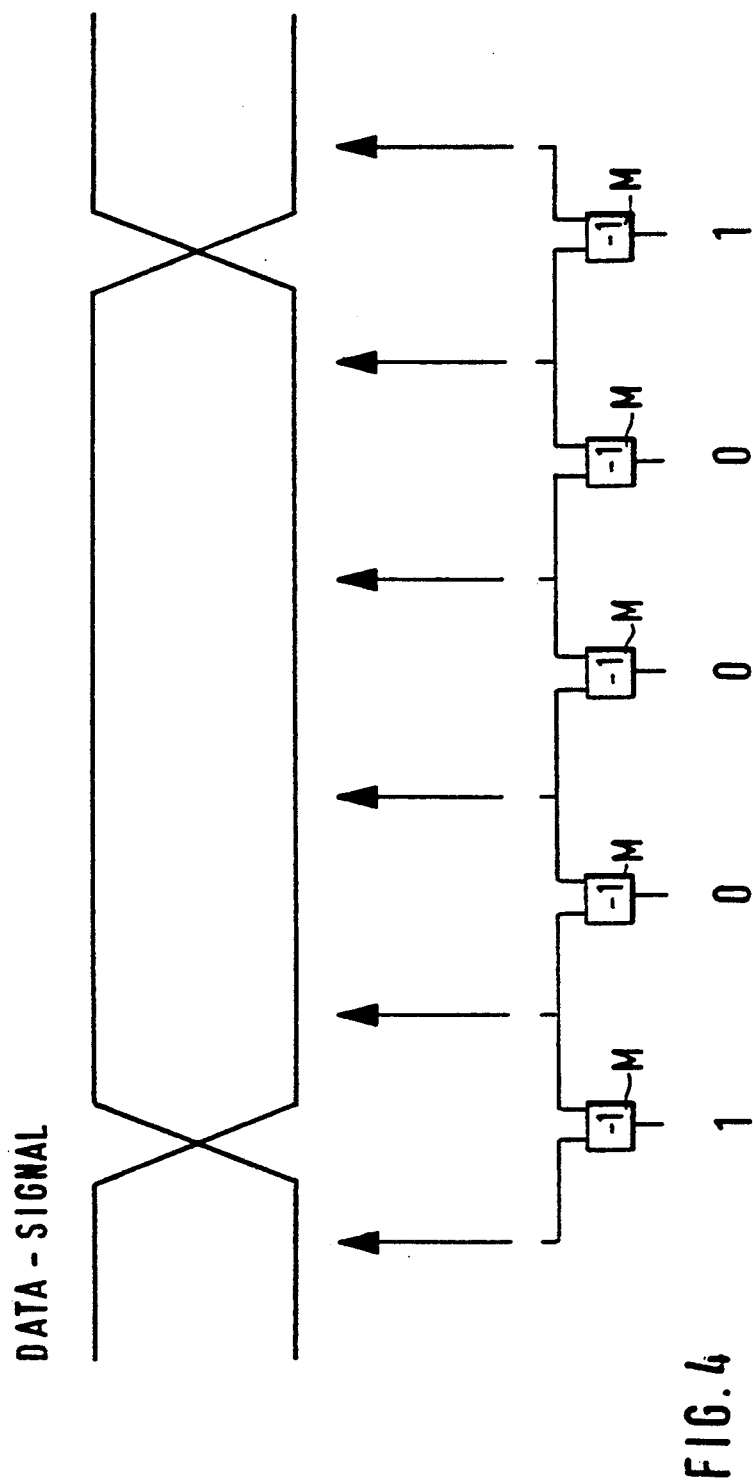
FIG. 4 is a diagram illustrating the data signal, the sampled signals and the correlation result of these signals.

From the diagram according to FIG. 4, a data signal is obtained that is drawn in at the very top of the figure. As indicated by the vertical arrows, the signal is sampled six times in the example shown. These sample data are correlated with each other. The results of this calculation are evaluated in a logic circuit (not shown).

To simplify the correlation, it is sufficient to correlate the adjacent signals with each other. EXOR gates are used as multipliers M in the correlation. One-bit counters (not shown here) can be used as integrators.

From the result of the correlation, the logic circuit can draw the following conclusions:

If a '1' is obtained at the output of the EXOR gates, then this means that a data exchange has taken place between the two sampling values on which the correlation is based. If a '0' is present at the output of an EXOR gate, then the two correlated sampling values are located in the eye opening. As can be seen from FIG. 4, the middle of an eye opening can be readily determined from the bit pattern.

Figure 5:
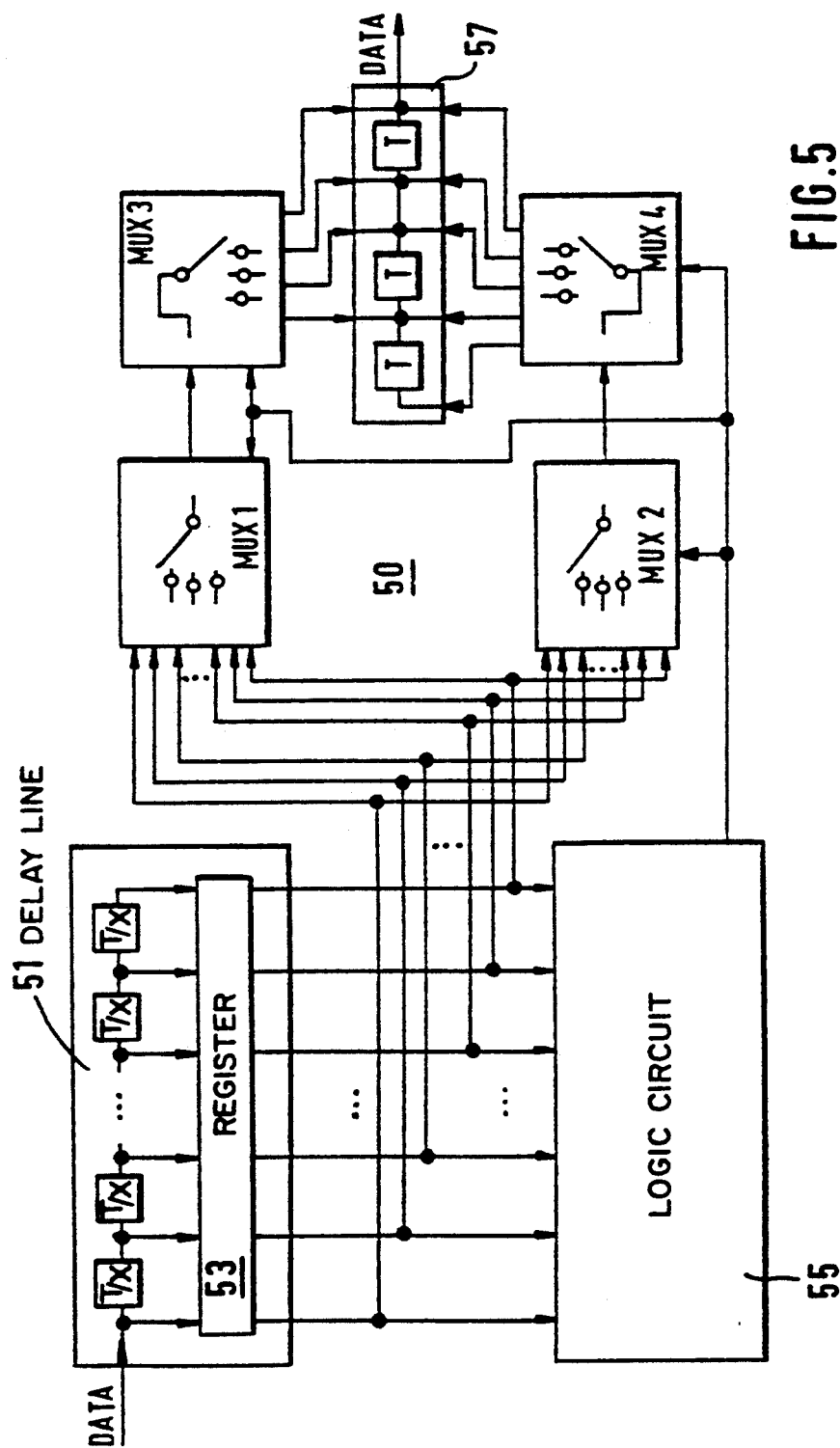
FIG. 5 is a block diagram of a synchronization circuit with a memory of variable length.

FIG. 5 shows a synchronization circuit 50, which includes a delay line 51 with a register 53 detecting the sampling values of the delay line and a logic circuit 55 for carrying out a correlation of the sampled signals and an evaluation of the correlation results or correlation functions for adjustment of the sampling to the center of an eye.

The delay line 51 shows several delay units, which are identified by T/x in this case.

x is selected as a function of the realization of the delay line. If the delay line is built up of flip-flops, for example, of D type flip-flops, then an integral number equal to or greater than 4 is selected for x. If delay units, such as inverters, are used in the realization of the delay line, then a real number equal to or greater than 4 is used for x.

Two multiplexers MUX 1 and MUX 2 work together with the logic circuit 55, and these write the sampled data into a memory 57, preferably into a FIFO memory. The writing-in of the data does not take place directly via the multiplexers MUX 1 and MUX 2, but via multiplexers MUX 3 and MUX 4, with the multiplexer MUX 3 being assigned to the first multiplexer MUX 1 and the multiplexer MUX 4 being assigned to the second multiplexer MUX 2. The synchronized data signal DS is located at the output of the memory.

To prevent a bit slip caused by wander, a so-called 'breathing' memory, particularly a FIFO memory, of variable length is used in this case. This is shown particularly in FIG. 5.

The function of the synchronization circuit 50 and the synchronization process resulting from this will be explained in greater detail below On the basis of the correlation of the sampling values of the delay line 51 in the logic circuit 55, the optimal sampling time, the middle of the eye opening, can be determined. On the basis of this sampling time, the multiplexers MUX 1 and MUX 2 are activated by the logic circuit.

In addition to the actual correlation, another correlation is carried out, in which, as explained with reference to FIG. 3, delayed signals $y_{(n+t)}$ or $x_{(n+T)}$ are used. The evaluation of this correlation function provides the possibility for determining whether the momentary sampling time is still optimal.

If the delay time of the delay line is known, the calculation of the correlation functions $R_{-1(K)}$ and $R_{+1(K)}$ can be dispensed with, because the course of the correlation functions is identical.

In the following, we start from the fact that, on the basis of the evaluation of the correlation results, an optimal sampling time has been found and that the sampling of the signal is carried out by means of the multiplexer MUX 1.

As soon as, because of wander, the optimal sampling time wanders out of the delay line, this is determined by the logic circuit by a comparison of the actual correlation with the correlation carried out in parallel. The multiplexer MUX 2 will now be activated additionally by the logic circuit 55.

For the case that the data signal is faster than the system clock, the multiplexers MUX 1 and MUX 2 are activated in such a way that they write in the momentary data into the memory 57 via the assigned multiplexers MUX 3 and MUX 4. In this case, the multiplexer MUX 3 writes in the old data and the multiplexer MUX 4 the new data, i.e., the data of the eye opening on which the further sampling will now be based. In this process, the length of the breathing memory is increased.

After this, the first multiplexer MUX 1 and the associated MUX 3 are inactivated. Further sampling of the data signal is carried out by means of the multiplexer MUX 2.

As soon as the eye opening on which the sampling via the multiplexer MUX 2 is based wanders out of the delay line and a new eye opening must be used as a basis for further sampling, the same procedure is again carried out. The logic circuit again activates both multiplexers MUX 2 and MUX 1 in order to enter both data into the memory 57 for the case that the data signal is faster than the clock.

From what has been stated above, it follows that whenever the eye opening on which the sampling is based wanders out of the delay line, a new eye opening is used as a basis for additional sampling. This new eye opening, or the new sampling time, is determined by a correlation. Whenever a new sampling time is selected, there is a switchover from the multiplexer MUX 1 to the multiplexer MUX 2 or vice versa, with the activation being provided by the logic circuit 55.

The switchover of the multiplexers MUX 1 and MUX 2 can also be carried out before an eye opening on which the sampling is based reaches the edge of the delay line.

If, contrary to the assumption made above, the data signal is slower than the clock of the system, the two multiplexers MUX 3 and MUX 4 are not activated by the logic circuit 55 when there is a switchover from a momentary eye opening to another eye opening. In that case, instead, the entry into the memory 57 is prevented for one clock period T; there is therefore no storage of the data during a change in the sampling time. Because of the fact that no entry into the FIFO is made during a clock period, this can be shortened. This is carried out by means of the multiplexers 3 or 4, depending on which of these is activated at the time.

Figure 6:
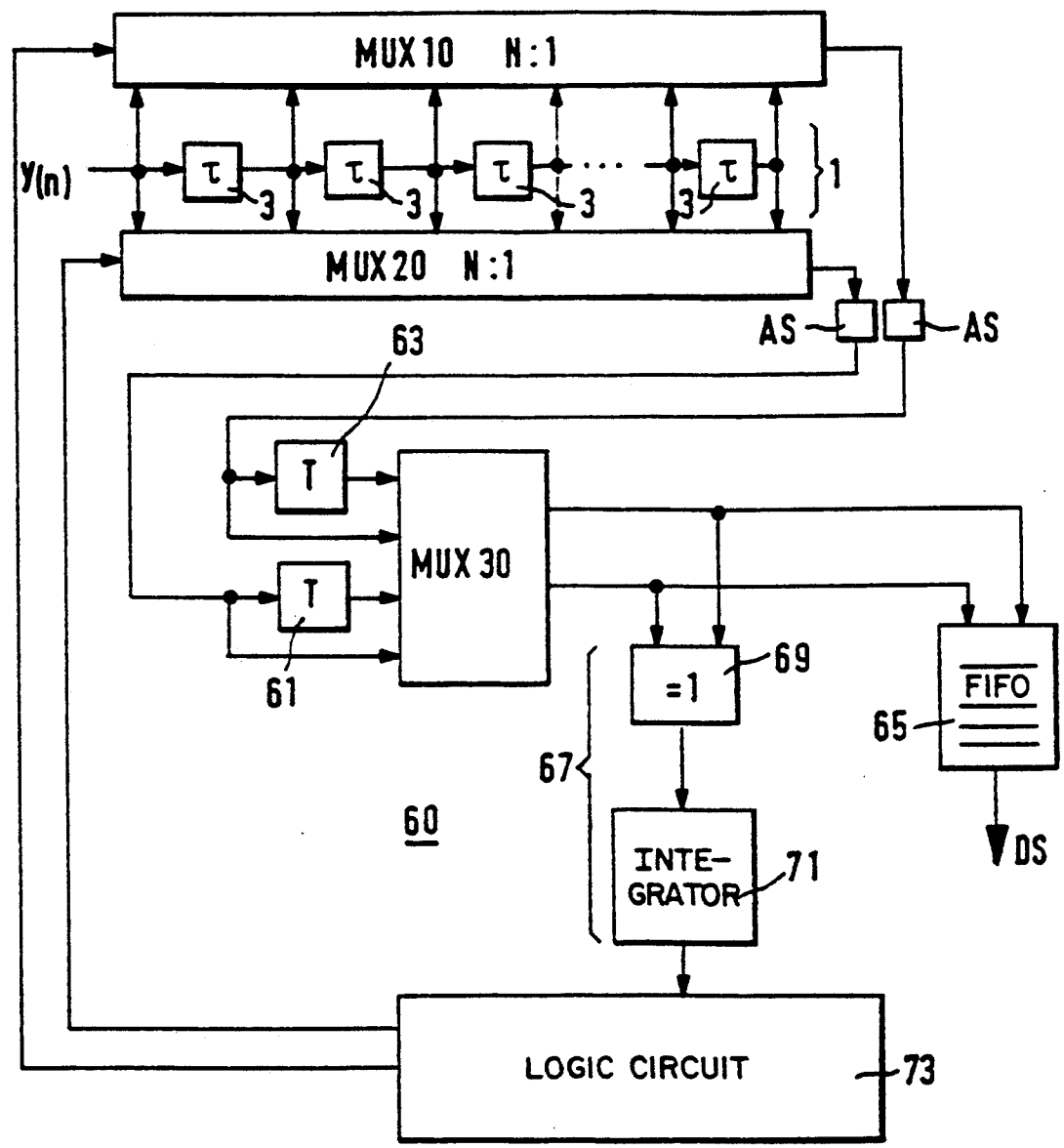
FIG. 6 is a block diagram of a synchronization circuit for the realization of a serial correlation.

FIG. 6 shows a schematic circuit diagram of a synchronization circuit 60, with which a serial correlation is carried out. The circuit contains a delay line 1, a first multiplexer MUX 10, a second multiplexer MUX 20 and a third multiplexer MUX 30. The latter is connected with the first two multiplexers via delay lines 61 and 63 The output lines of the multiplexer MUX 30 is connected to a memory 65, which is preferably designed as a FIFO memory. The synchronized data signal DS is present at the output of this memory. The output signals of the multiplexer MUX 30 are subjected to a correlation, with the correlator 67 indicated here showing a multiplier 69 and an integrator 71. In this case, for example, an EXOR gate is intended as a multiplier. The integrator 71 is designed as a counter. The counter can also be a 1-bit counter with overflow.

The result of the correlation is supplied to a logic circuit 73, which determines the center of the eye opening from the correlation and activates the two multiplexers MUX 10 and MUX 20 appropriately.

The circuit shown here is used for the case that the delay time of the delay line 1, of which only a few delay members 3 are shown, is unknown.

In principle, a complete correlation of the signals taken from the delay line 1 must be carried out here. To realize this process, however, the circuit complexity can be reduced by the fact that the correlation is calculated serially rather than in parallel. However, it is required for this that the individual correlation results are stored, so that the optimal sampling time can then be determined from this in the logic circuit.

The serial processing leads to the fact that the optimum sampling time cannot be determined as rapidly as in the parallel processing A reaction to wander can therefore not take place as rapidly. In this processing method, therefore, only slower wanders without bit errors can be compensated.

It is an essential principle of the synchronization process described here, that the scanning takes place in the middle of the eye opening and not at the edge. As a result, the circuit and the process are significantly less sensitive to jitter on the data signal than conventional circuits or processes.

Instead of a PLL, a delay line is therefore used here, whose signals are tapped and the sampling values are correlated with each other. With the use of a logic circuit, the maximum of the correlation functions is determined in order to obtain an optimal sampling time. The maximum correlation is reached in the middle of the eye opening. Therefore, if a multiplexer is set to the maximum of the correlation, the sampling of the data signal will take place in the region of the middle of the eye opening.

A simplification of the process is achieved by the fact that a discrete correlation of the taps is carried out. Insofar as a value definition of the signals used in the correlation is also carried out, a further simplification of the circuit can be achieved By the assignment of a '1' for a HIGH level and a '−1' for a LOW level, a value-discrete consideration of the signals $x_{(n)}$ and $y_{(n)}$ is reached.

For a correlation of these functions, a digital circuit can be used, in which the multipliers are realized as EXOR gates and the integrators by means of counters.

With respect the circuit arrangement according to FIG. 6, it must be stated, in principle, that a symmetrical design was selected Through the fact that two multiplexers MUX 10 and MUX 20 are provided, one of the multiplexers can be used for sampling of the actual data signal while the other serves to determine a side eye, which is located before or after the actual sampling eye, or can be used to monitor the sampling time within the actual eye.

On the basis of the symmetrical circuit design, the function of the two multiplexers can be freely exchanged, with the multiplexer originally intended for the data path being assigned to the correlation path and vice versa.

The switchover of the two multiplexers MUX 10 and MUX 20 is carried out by means of the multiplexer MUX 30 connected with these. As a result of the circuit design selected here, a switchover is possible for very high data frequencies.

To simplify the realization of the circuit arrangement, between the multiplexers MUX 10 and MUX 20 and the multiplexer MUX 30 there is connected a sampling circuit AS in each case, which converts the time-continuous signals of the multiplexers MUX 10 and MUX 20 to time-discrete signals. The further processing of these signals can then be carried out in a significantly simpler manner.

In a particularly preferred manner, the sampling circuits AS are realized as flip-flops. In this way, instead of the cross correlation, the pulse response of the transmission systems connected ahead of the circuit according to FIG. 6 can be evaluated in order to determine the optimal sampling time, the middle of the eye opening.

If a circuit of this type is used in an ergodic system, in which a slow wander appears, then a serial correlation is carried out.

The circuit shown can also be used in a plesiochronous system, in which different clock frequencies appear in different regions. In a combination of data over regions of different clock frequencies, data losses normally occur as a result of bit slips, which can be prevented by means of the circuit according to the invention. However, we must start from the fact that the difference between the individual clock frequencies must not be too great. An adaptation of the data signals is also required: stuffing mechanisms, for example, stuffing bits, must be inserted so that the synchronization and regeneration of the data signals can proceed in an error-free manner.

The circuit explained with reference to FIG. 6 can also be used for mesochronous systems. Here again, although only a single system clock is preset, a shift in the system clock may occur in various regions of the system, for example, on the basis of component tolerances and temperature changes. A wander of the data signal is produced as a result. With the circuit explained here, the data signal can be synchronized and regenerated in a very simple manner, despite this wander.

The process can also be used in closed digital systems, such as switching systems or in transmission technology.

After all this, it is found that, with the synchronization process described here, by means of a correlation of sampling values of a delay line, an optimal sampling point in the middle of the eye opening of the data signal is calculated This process is therefore significantly less sensitive to jitter than others. A bit loss based on wander is prevented by a memory, in this case by a FIFO.

The circuit arrangement and the process described here can thus be used for compensation of jitter and wander of a data signal. They can therefore be used in all serial digital data connections. In particular, it is also possible to process plesiochronous data flows with the process, i.e., data in a system with local clocks, if a so-called stuffing technique is connected in series.

What is claimed is:

1. A circuit arrangement for regenerating an synchronizing a high-bit-rate digital signal $y_{(n)}$ into a synchronized digital signal $x_{(n)}$, comprising:
   a variable delay line connected to the digital signal $y_{)n)}$ for generating a series of time delayed signals for each bit of said digital signal;
   a correlation circuit ( 5,7 or 35,37) connected tot he digital signal $y_{(n)}$, the time delayed signals of the variable delay line, and to the synchronized digital data $x_{(n)}$, said correlation circuit generating correlation output signals representing the correlation between the synchronized data signal $x_{(n)}$ and the digital signal $y_{(n)}$;
   at least one logic circuit (13; 55; or 73) connected to the correlation output signals for evaluating the correlation output signals and generating a control signal which represents the middle of the eye opening between the digital signal $y_{(n)}$ and the synchronized digital signal $x_{(n)}$; and
   a multiplexer (11) connected to the output of the logic circuit, the digital signal $y_{(n)}$, and the time delayed signals from the variable delay line, for generating the synchronized digital signal $x_{(n)}$ based upon the control signal from the logic circuit.

2. A circuit arrangement as claimed in claim 1, wherein the correlation is calculated in a serial mode, and wherein the multiplexer comprises:
   a first multiplexer (10) connected to the control signal of the logic circuit, the digital signal $y_{(n)}$, and the time delayed signal of the variable delay line, for sampling the digital signal $y_{(n)}$ at its maximum eye opening based upon the logic circuit output signal, and thereby generating a first output signal, and a second multiplexer (20) connected to the control signal of the logic circuit, the digital signal $y_{(n)}$, and the time delayed signals of the variable delay line, for determining a change in the actual sampling eye, and thereby generating a second output signal; and
wherein the circuit arrangement further comprises:
   a least one delay circuit (61, 63) connected the first ad second output signals for generating time delayed outputs of these first and second output signals;
   a third multiplexer (30) connected to the first and second signals and the time delayed outputs of these first and second output signals for generating two outputs; and
wherein the correlation circuit (67) receives the two outputs of the third multiplexer and wherein the logic circuit (73) determines the middle of the eye opening and appropriately activates the first and second multiplexers (10,20) via the control signals generated by the logic circuit.

3. A circuit arrangement as claimed in claim 1, wherein the correlation circuit comprises:
   a plurality of multipliers (5;35) connected to the time delayed signals and the synchronized digital signal $x_{(n)}$; and
   a like plurality of integrators (7;37) each connected to the output of one multiplier for performing a discrete correlation.

4. A circuit arrangement as claimed in claim 3, wherein EXOR gates and counters are used for the multipliers and integrators, respectively.

5. A circuit arrangement as claimed in claim 4, wherein the counters are 1-bit counters with overflow.

6. A circuit arrangement as claimed in claim 1, wherein to compensate for a bit slip caused by a wander, multiplexer (11) had means for generating two outputs representing the digital signal for the current eye opening and a digital signal for a new eye opening, said new eye opening determined when a bit error occurs due to wander of the eye opening, and wherein said circuit arrangement further comprises a memory (33;57; 65) connected to the multiplexer outputs for storing the original and new eye opening digital signals and int urn generating the digital signal $x_{(n)}$ from the digital signals stored therein.

7. A circuit arrangement as claimed in claim 6 wherein said multiplexer comprises two multiplexers (MUX 1, MUX2) each connected to the output of the logic circuit, the digital signal $y_{(n)}$, and the time delayed signals from the variable delay line, for sampling the digital signal $y_{(n)}$ at its original maximum eye opening as well as any new maximum eye opening due to wander, said eye openings determined based upon the logic circuit output signals, said multiplexers generating respective output signals for writing data into the memory (57); and two additional multiplexers (MUX 3, MUX 4) connected to the outputs of said two multiplexers and to the logic circuit output signals so as to vary the length of the memory and generate therefrom the synchronized digital signal $x_{(n)}$, wherein the memory length is increased if the current digital signal $y_{(n)}$ is faster than the rate determined by the original eye opening and wherein the memory length is decreased in the current digital signal $y_{(n)}$ is slower than the rate determined by the original eye opening.

8. A circuit arrangement as claimed in claim 3, wherein the correlation is calculated in a serial mode, and wherein the multiplexer comprises:

a first multiplexer (10) connected to the control signal of the logic circuit, the digital signal $y_{(n)}$, and the time delayed signal of the variable delay line, for sampling the digital signal $y_{(n)}$ at its maximum eye opening based upon the logic circuit output signal, and thereby generating a first output signal, and a second multiplexer (20) connected to the control signal of the logic circuit, the digital signal $y_{(n)}$, and the time delayed signals of the variable delay line, for determining a change in the actual sampling eye, and thereby generating a second output signal; and wherein the circuit arrangement further comprises:

at least one delay circuit (61,63) connected the first and second output signals for generating time delayed outputs of these first and second output signals;

third multiplexer (30) connected to the first and second signals and the time delayed outputs of these first and second output signals for generating two outputs; and wherein the correlation circuit (67) receives the two outputs of the third multiplexer and wherein the logic circuit (73) determines the middle of the eye opening and appropriately activates the first ad second multiplexers (10,20) via the control signals generated by the logic circuit.

9. A circuit arrangement as claimed in claim 6, wherein said memory is a FIFO type memory.

10. A method as claimed in claim 9, wherein to compensate for a wander of the data signal from a system clock, a new eye opening is chosen as a new sampling point, said new eye opening being determined by means of a correlation.

11. A method as claimed in claim 10, wherein signals of the delay line which are adjacent to each other are correlated using 1-bit counters as integrators.

12. A method as claimed in claim 11, wherein the correlation is calculated serially and the correlation results for determination of the eye opening as a sampling time are stored in a memory.

13. A method as claimed in claim 11, wherein:
at least one memory is used for bit slip compensation;
new and old data are written into the memory at the same clock time, if the data signal is faster than the system clock; and
data signals $x_{(n)}$ or $y_{(n+k)}$ are delayed by a clock period if the data signal is slower than the system clock.

14. A method as claimed in claim 11, wherein a memory is used for bit slip compensation, whose length is preferably extended by at least one multiplexer if the data signal is faster than the system clock, and whose length is preferably reduced by at least one multiplexer if the data signal is slower than the system clock.

15. A method as claimed in claim 12, wherein:
at least one memory is used for bit slip compensation;
new and old data are written into the memory at the same clock time, if the data signal is faster than the system clock; and
data signals $x_{(n)}$ or $y_{(n+k)}$ are delayed by a clock period if the data s is slower than the system clock.

16. A method as claimed in claim 12, wherein a memory is used for bit slip compensation, whose length is preferably extended by at least one multiplexer if the data signal is faster than the system clock, and whose length is preferably reduced by at least one multiplexer if the data signal is slower than the system clock.

17. A method of regenerating and synchronizing a high-bit-rate digital data signal $y_{(n)}$ into a synchronized high-bit-rate digital data signal $x_{(n)}$, comprising the steps of:

receiving the high-bit-rate digital data signal $y_{(n)}$ and delaying said signal for each bit of said signal into a plurality of time delay signals $y_{(n+k)}$, where $k=0, \ldots, L-1$, wherein n is a sampling step and L is the number of sampling values;

tapping individual signals $x_{(n)}$ and $y_{(y+k)}$ from the delay line;

correlating the tapped signals by discrete correlation in accordance with the equation:

$$R_{(k)} = \sum_{n=0}^{N-1} x_{(n)} \cdot y_{(k+n)}$$

, where N is a positive integer greater than one;
determining the maximum correlation between the signal $x_{(n)}$ and $y_{(x+k)}$;
receiving the high-bit-rate digital signal $y_{(n)}$ and the tap delayed signals $y_{(n+k)}$ in a multiplexer; and
adjusting the output of the multiplexer by the determined maximum correlation so as to generate the high-bit-rate digital data signal $x_{(n)}$.

* * * * *

UNITED STATES PATENT AND TRADEMARK OFFICE
CERTIFICATE OF CORRECTION

PATENT NO. : 5,251,238
DATED : October 5, 1993
INVENTOR(S) : K. Menk et al It is certified that error appears in the above-identified patent and that said Letters Patent is hereby corrected as shown below:

At column 9, line 64, please change "an" to --and--.

At column 10, line 3, please change "tot he" to --to the--; and at line 37, please change "ad" to --and--.

At column 11, line 4, please change "int urn" to --in turn--;

at line 26, please change "in" to --if--; and at line 56, please change "ad" to --and--.

At column 12, line 30, please change "data s" to --data signal--; and at line 46, please change "$y_{(y+k)}$" to --$y_{(n+k)}$--.

Signed and Sealed this

Twelfth Day of April, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,251,238
DATED : October 5, 1993
INVENTOR(S) : Klaus-Dieter Menk
Helmut Preisach It is certified that error appears in the above-indentified patent and that said Letters Patent is hereby corrected as shown below:

Column 11, line 61, please change "9" to --17--.

Signed and Sealed this

Fifth Day of September, 1995

*Attest:*

BRUCE LEHMAN

*Attesting Officer*      *Commissioner of Patents and Trademarks*